United States Patent Office 3,009,891
Patented Nov. 21, 1961

3,009,891
AQUEOUS DISPERSIONS OF GELATINOUS POLYMERIC REACTION PRODUCTS
Wilfrid Cooper, Birmingham, England, assignor to Dunlop Rubber Company Limited, London, England, a British company
No Drawing. Filed June 30, 1958, Ser. No. 745,325
13 Claims. (Cl. 260—23.7)

This invention relates to the preparation of aqueous polymer dispersions and in particular to the preparation of aqueous dispersions of gelatinous polymeric reaction products.

In the preparation of polymers using heterogeneous surface-active catalysts, the product obtained from the reactor is frequently in the form of a stiff jelly and hence the catalyst and unconverted monomer cannot be readily removed therefrom using the conventional synthetic rubber latex processing equipment.

It is an object of the present invention to provide aqueous dispersions of such polymeric reaction products which can be readily processed in the manner normally used for synthetic rubber lattices.

According to the present invention a process for the preparation of an aqueous dispersion of a gelatinous polymeric reaction product obtained by means of a heterogeneous surface-active catalyst comprises incorporating in the polymeric reaction product an organic acid capable of forming a water-soluble soap, converting the said acid into a water-soluble soap and agitating the composition with water.

The term "gelatinous" as applied to polymeric reaction products in the specification and claims includes those products which are highly viscous or exhibit jelly-like characteristics.

The gelatinous polymeric reaction products which are particularly suitable for use in the present invention are those obtained by polymerizing an unsaturated aliphatic compound containing a

group or copolymerizing said monomer with a compound copolymerizable therewith. This reaction is usually conducted in a liquid reaction medium.

The conversion of the organic acid into a water-soluble soap is generally effected by reacting the acid with a base capable of forming such a soap, thus enabling the gelatinous reaction product to be disintegrated into a coarse dispersion on agitation.

The surface-active catalysts used in preparing the polymeric reaction products are of the type wherein the polymerization is effected by the absorption of the monomer on the active surfaces thereof. Examples of these surface-active catalysts are mixtures of a compound of a heavy metal selected from groups IVB to VIIB or group VIII of the periodic table together with a compound selected from one of the following classes:

(a) An organic compound of a metal of groups I to IV of the periodic table, preferably of groups II and IIIA,
(b) A metal or organo-metal hydride,
(c) An organo-metal halogen compound.

Suitable compounds of the selected heavy metals are the halides, those of titanium, zirconium, vanadium, tantalum, tungsten, manganese, iron, cobalt and nickel being preferred, while chlorine is the preferred halogen. The higher halides are especially suitable and include titanium tetrachloride (TiCl$_4$), zirconium tetrachloride (ZrCl$_4$) and vanadium tetrachloride (VCl$_4$).

Suitable organic compounds of class (a) are the alkyls of the selected metals, especially those of groups II and IIIA. The preferred alkyls of the group IIIA metals are those having the formulae BR$_3$ and AlR$_3$ where B represents boron, Al represents aluminium and R represents an alkyl group, e.g. ethyl, isobutyl. The preferred alkyls of the group II elements are those having the formulae MgR$_2$ZnR$_2$ and CdR$_2$ where Mg, Zn and Cd represent magnesium, zinc and cadmium respectively and R represents an alkyl group.

The speed of the polymerization reaction is furthermore influenced by the degree of sub-division of the active surface with which the unsaturated aliphatic compound is brought into contact. For instance, the surface-active catalyst can be adsorbed on cryolite or on a finely divided filler such as silica or carbon black. The silica can consist of either a three-dimensional cross-linked network or a lattice distorted by the presence of an element of variable valency such as chromium or iron.

The surface-active catalysts are not true catalysts in the strict scientific meaning of the word, as they do not remain during the reaction exactly the same as they were when originally added. They may, however, be present in small non-stoichiometric quantities and still bring about comparatively large conversions. The catalysts form compounds with, for example, olefins and such compounds are frequently contained in the reaction products as by-products. In other cases, portions of the catalysts are first of all bound to the polymer reaction product, these portions still containing the metal or metal-reacting elements of the original catalyst. Furthermore, on examination of the polymer reaction products it has been shown that the catalyst itself can appear in the polymer.

In the present invention these bound metals or metal-reacting elements are removed on treatment of the polymer reaction product with the organic acid, when a small amount of hydrogen equivalent to the bound metal or metal-reacting element enters the polymer.

Of the organic acids capable of forming water-soluble soaps, those containing at least eight carbon atoms in the molecule are preferred such as the higher aliphatic unsaturated monobasic carboxylic acids with one or more ethylenic linkages, e.g. oleic acid, linoleic acid and linolenic acid, and the higher aliphatic saturated monobasic carboxylic acids usually called the higher fatty acids, e.g. capric acid, lauric acid, palmitic acid and stearic acid. However, of these two classes of carboxylic acids those containing from 8 to 20 carbon atoms in the molecule are preferred.

Selected rosin acids, when in the form of their water-soluble salts, can also be used as soaps in the present invention. The preferred rosin acids are dehydroabietic acid, 7,8-dihydroabietic acid, tetrahydroabietic acid, dextropimaric acid and dihydrodextropimaric acid. These compounds may be prepared from rosin or from abietic acid by known methods such as by dehydrogenation or hydrogenation of rosin or they may be made by other processes. The water-soluble salts or soaps of the above-described rosin acids can, moreover, be employed either alone or in mixtures with soaps of the said unsaturated carboxylic acids and/or the said fatty acids.

While any base capable of forming a water-soluble soap with the acid can be used, the hydroxides of ammonium and the alkali metals are preferred.

The amount of organic acid used can vary over wide limits depending upon the nature of the polymer and the surface-active catalyst, but is preferably from 5 percent to 15 percent by weight based on the polymer and usually of the order of 10 percent.

The amount of base added is preferably just sufficient to react with the acid which remains after the removal of the metal or metal-reacting portions of the catalyst present in the polymer reaction product.

When a liquid reaction medium is employed in the production of the polymeric reaction product it enables rapid rates of polymerization to be achieved and functions as a solvent to ensure the continuous removal of solid polymers from the catalyst. It also serves as a means of contacting the monomer with the catalyst if, for example, the monomer is dissolved in the liquid reaction medium which already contains the surface-active catalyst. Various classes of hydrocarbons or their mixtures which are liquid under the polymerization conditions can be used.

The saturated aliphatic hydrocarbons (alkanes and cycloalkanes) are especially suitable as reaction media and include n-pentane, n-hexane, 2,3-dimethylbutane, n-octane, isooctane (2,2,4-trimethylpentane), cyclohexane and dimethylcyclopentane. Members of the aromatic hydrocarbon series, particularly the mononuclear aromatic hydrocarbons e.g. benzene, toluene, xylenes and mesitylene, can be employed and in addition compounds such as ethyl benzene, ethyl toluene and isopropylbenzene.

The ratio by volume of liquid reaction medium to polymer is generally not more than 4:1, and is preferably of the order of 1:1.

The process of this invention is particularly suitable when applied to gelatinous polymers of conjugated diolefines, including unsubstituted dienes, e.g. butadiene, and substituted dienes, e.g. isoprene, and to the gelatinous amorphous polymers and copolymers from aliphatic mono-olefines, e.g. polymers of propylene and ethyl ethylene (butene-1) and a copolymer of ethylene and propylene.

The aqueous polymer dispersion prepared in accordance with the present invention can be stripped of monomer or volatile solvent and the polymer coagulated, isolated, washed and dried by the standard techniques employed in handling a synthetic rubber latex.

The invention is illustrated by the following examples, all parts being by volume except where otherwise stated:

*Example I*

30 parts of liquid butadiene were added to 30 parts of heptane containing a surface-active catalyst prepared by mixing 0.6 part of aluminium triisobutyl with 0.08 part of titanium tetrachloride. As a result the temperature of the resulting mixture rose spontaneously to 50° C. after one hour, when the reaction was substantially complete. The mixture was then allowed to stand at room temperature for sixteen hours in order to ensure that it was fully reacted.

Three parts of oleic acid were mixed into the resulting gelatinous mass and when the mixture was homogeneous, 10 parts of a 4% solution by weight of sodium hydroxide were added. The gel was then vigorously stirred with 200 parts of water when a coarse dispersion of swollen polymer was produced which was stripped of monomer in a still unit and the polymer coagulated, isolated, washed and dried.

*Example II*

1 part of lauric acid was incorporated in 100 parts of a gelatinous mixture of polyisoprene and benzene containing 10 percent by weight of the polymer, which had been prepared by reacting isoprene with a surface-active catalyst consisting of a mixture of aluminium triisobutyl and titanium tetrachloride in a benzene reaction medium. When the mixture was homogeneous, 5 parts of a 4 percent by weight solution of sodium hydroxide were added which resulted in a product in the form of an opaque mobile fluid. 100 parts of water were then slowly introduced into the fluid while it was being vigorously stirred and a stable creamy latex of viscosity ca. 60 centipoises was obtained. The latex was stripped of monomer and solvent with steam in a still unit giving 150 parts of a fine particle size latex containing 6 percent by weight of polymer, which creamed on standing to form an upper layer of 20 parts containing most of the polyisoprene. By the addition of acid to the latex the polymer was coagulated and subsequently isolated, washed and dried in the usual way.

Similar results were obtained by substituting iso-octane for benzene as the solvent and either dehydrogenated rosin acids (2 parts) or linseed oil fatty acids (1.5 parts) for the lauric acid. The average composition of the mixed fatty acids in linseed oil approximates to: 10–15 percent saturated acid (palmitic and stearic acid), 15–25 percent oleic acid, 15–20 percent linoleic acid and 45–55 percent linolenic acid.

*Example III*

Ethylene and propylene were copolymerized to form a polymer containing 47 percent by weight of propylene using a surface-active catalyst consisting of a mixture of vanadium tetrachloride and aluminium triisobutyl in a petroleum ether reaction medium. 0.5 part of lauric acid was incorporated in 5 parts of the resulting jelly-like mass of copolymer. When the mixture was homogeneous, 1.75 parts of a 4 percent solution by weight solution of sodium hydroxide was added. One hundred parts of water were then slowly introduced into the gelatinous mixture which step was accompanied by vigorous stirring to ensure thorough emulsification of the latex obtained. After stabilizing the latex against coagulation by the addition of 5 percent by weight of "Teepol" based on the weight of copolymer, the latex was stripped of monomer and solvent with steam in a still unit. Acid was then added to the stripped latex whereby the copolymer was coagulated and subsequently isolated, washed and dried in the usual way. The copolymer was obtained as a colorless transparent rubber.

The word "Teepol" is the name given to a proprietary product consisting of a mixture of sodium salts of higher secondary alkyl sulphates derived from petroleum.

Having now described my invention, what I claim is:

1. A process for obtaining in a form in which they can be easily treated and used gelatinous elastomeric polymerization products of unsaturated aliphatic hydrocarbons which have been formed by polymerizing at least one unsaturated aliphatic hydrocarbon by means of a catalyst comprising a mixture of a compound selected from the group which consists of the halides of titanium, zirconium, vanadium, tantalum, tungsten, manganese, iron, cobalt and nickel and a compound selected from the group which consists of the dialkyls of magnesium, zinc and cadmium and the trialkyls of boron and aluminium, which comprises incorporating in the gelatinous product resulting from the polymerization about 5 percent to about 15 percent, based on the weight of the polymer contained therein, of a carboxylic acid containing at least 8 carbon atoms in the molecule which is capable of forming a soap having some solubility in water, forming such a soap from the acid by adding to the said gelatinous product containing the acid a base in amount sufficient to react with the remaining acid, and agitating the product together with water.

2. A process according to claim 1, wherein a fatty acid containing 8–20 carbon atoms is incorporated in the gelatinous product.

3. A process according to claim 2 wherein a saturated fatty acid is employed.

4. A process according to claim 1, wherein a dihydrogenated rosin acid is incorporated in the gelatinous product.

5. Process according to claim 1, wherein the agitation of the product with water is effected at an elevated temperature up to 100° C. until the mixture is substantially free from residual unpolymerized monomer.

6. Process according to claim 1, wherein the soap is formed by treating the gelatinous product containing the carboxylic acid with a suitable base.

7. A process for obtaining in a form in which they can be easily treated and used gelatinous elastomeric polymerization products of unsaturated aliphatic hydrocarbons which have been formed by polymerizing at least one unsaturated aliphatic hydrocarbon by means of a catalyst comprising a mixture of a compound selected from the group which consists of the halides of titanium, zirconium, vanadium, tantalum, tungsten, manganese, iron, cobalt and nickel and a compound selected from the group which consists of the dialkyls of magnesium, zinc and cadmium and the trialkyls of boron and aluminium, which comprises incorporating in the gelatinous product resulting from the polymerization 5–15% of its weight of a carboxylic acid containing at least 8 carbon atoms in the molecule which is capable of forming a soap having some solubility in water, forming such a soap from the acid by adding to the said gelatinous product containing the acid a base in amount sufficient to react with the remaining acid, and agitating the product together with water.

8. A process for obtaining in a form in which they can be easily treated and used gelatinous elastomeric polymerization products of conjugated dienes which have been formed by polymerizing at least one conjugated diene by means of a catalyst comprising a mixture of a compound selected from the group which consists of the halides of titanium, zirconium, vanadium, tantalum, tungsten, manganese, iron, cobalt and nickel and a compound selected from the group which consists of the dialkyls of magnesium, zinc and cadmium and the trialkyls of boron and aluminum, which comprises incorporating in the gelatinous product resulting from the polymerization 5–15% of its weight of a carboxylic acid containing at least 8 carbon atoms in the molecule which is capable of forming a soap having some solubility in water, forming such a soap from the acid by adding to the said gelatinous product containing the acid a base in amount sufficient to react with the remaining acid, and agitating the product together with water.

9. Process according to claim 8, wherein the agitation of the product with water is effected at an elevated temperature up to 100° C. until the mixture is substantially free from residual unpolymerized monomer.

10. Process according to claim 8, wherein the soap is formed by treating the gelatinous product containing the carboxylic acid with a suitable base.

11. A process for obtaining in a form in which they can be easily treated and used gelatinous elastomeric polymerization products of unsaturated aliphatic hydrocarbons which have been formed by polymerizing at least two monoolefines by means of a catalyst comprising a mixture of a compound selected from the group which consists of the halides of titanium, zirconium, vanadium, tantalum, tungsten, manganese, iron, cobalt and nickel and a compound selected from the group which consists of the dialkyls of magnesium, zinc and cadmium and the trialkyls of boron and aluminium, which comprises incorporating in the gelatinous product resulting from the polymerization 5–15% of its weight of a carboxylic acid containing at least 8 carbon atoms in the molecule which is capable of forming a soap having some solubility in water, forming such a soap from the acid by adding to the said gelatinous product containing the acid a base in amount sufficient to react with the remaining acid, and agitating the product together with water.

12. Process according to claim 11, wherein the agitation of the product with water is effected at an elevated temperature up to 100° C. until the mixture is substantially free from residual unpolymerized monomer.

13. Process according to claim 11, wherein the soap is formed by treating the gelatinous product containing the carboxylic acid with a suitable base.

References Cited in the file of this patent

UNITED STATES PATENTS

| | | |
|---|---|---|
| 2,467,054 | Rumbold | Apr. 12, 1949 |
| 2,838,477 | Roelen et al. | June 10, 1958 |

FOREIGN PATENTS

| | | |
|---|---|---|
| 538,782 | Belgium | Dec. 6, 1955 |

OTHER REFERENCES

Moilliet et al.: Surface Activity, pp. 180–181, E. & F. N. Ltd., London (1951).